United States Patent Office 3,705,909
Patented Dec. 12, 1972

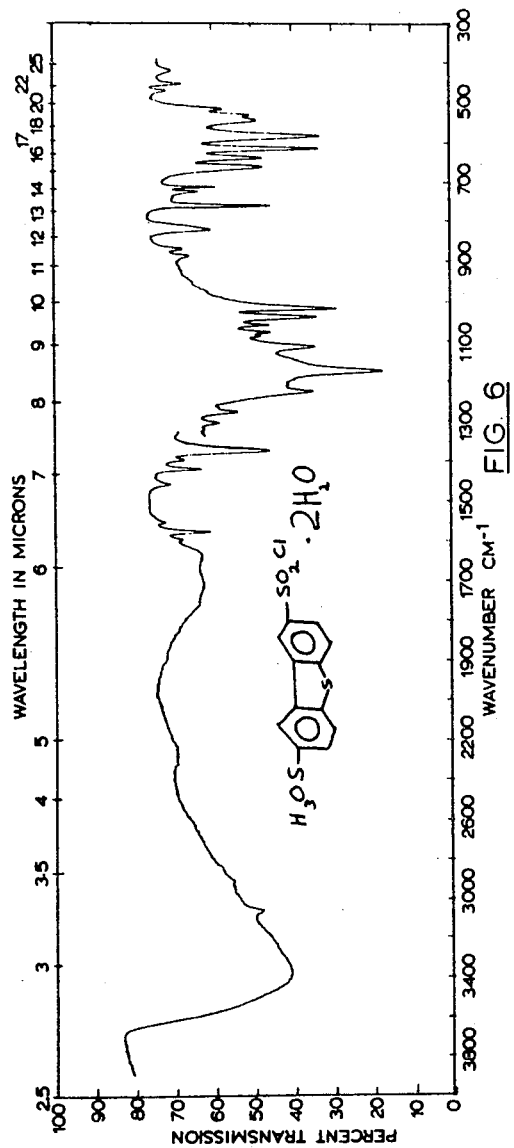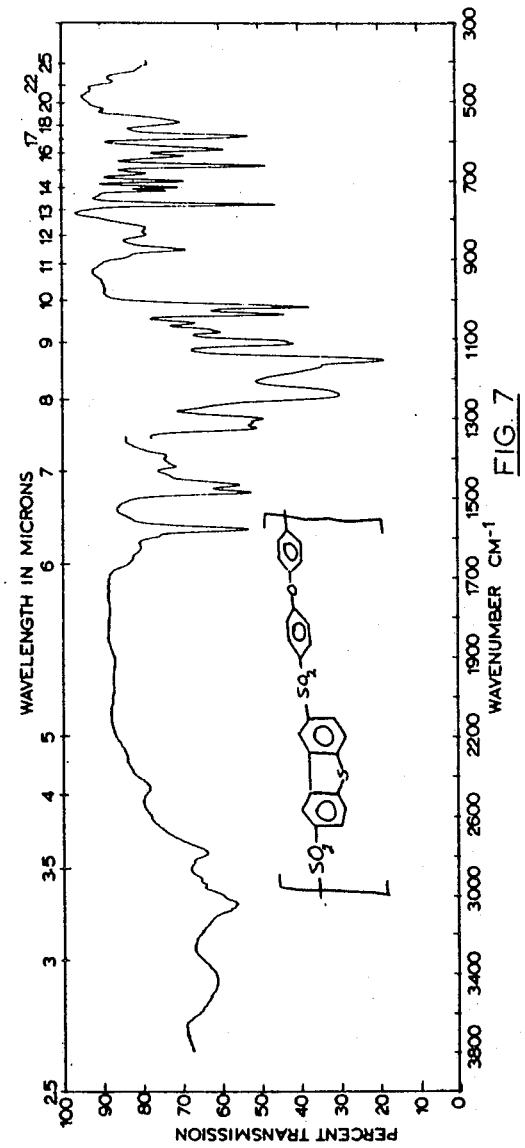
FIG. 6
FIG. 7

3,705,909
DIBENZOTHIOPHENE SULFONYL HALIDES
William Bruce Scott, Vancouver, British Columbia, and Peter Laurence Simpson, Clarkson, Ontario, Canada, assignors to Gulf Oil Canada Limited, Toronto, Ontario, Canada
Filed Dec. 24, 1970, Ser. No. 101,350
Int. Cl. C07d 63/24
U.S. Cl. 260—329.3                       11 Claims

ABSTRACT OF THE DISCLOSURE

This invention relates to new dibenzothiophene sulfonyl halides, their preparation, and novel polymers derived therefrom. The thermosplastic thermally stable polymers so formed are aromatic polysulfones, aromatic polysulfonamides, and aromatic polysulfonates useful as thermal insulating coatings for electrical wiring and circuitry.

Figure 1:
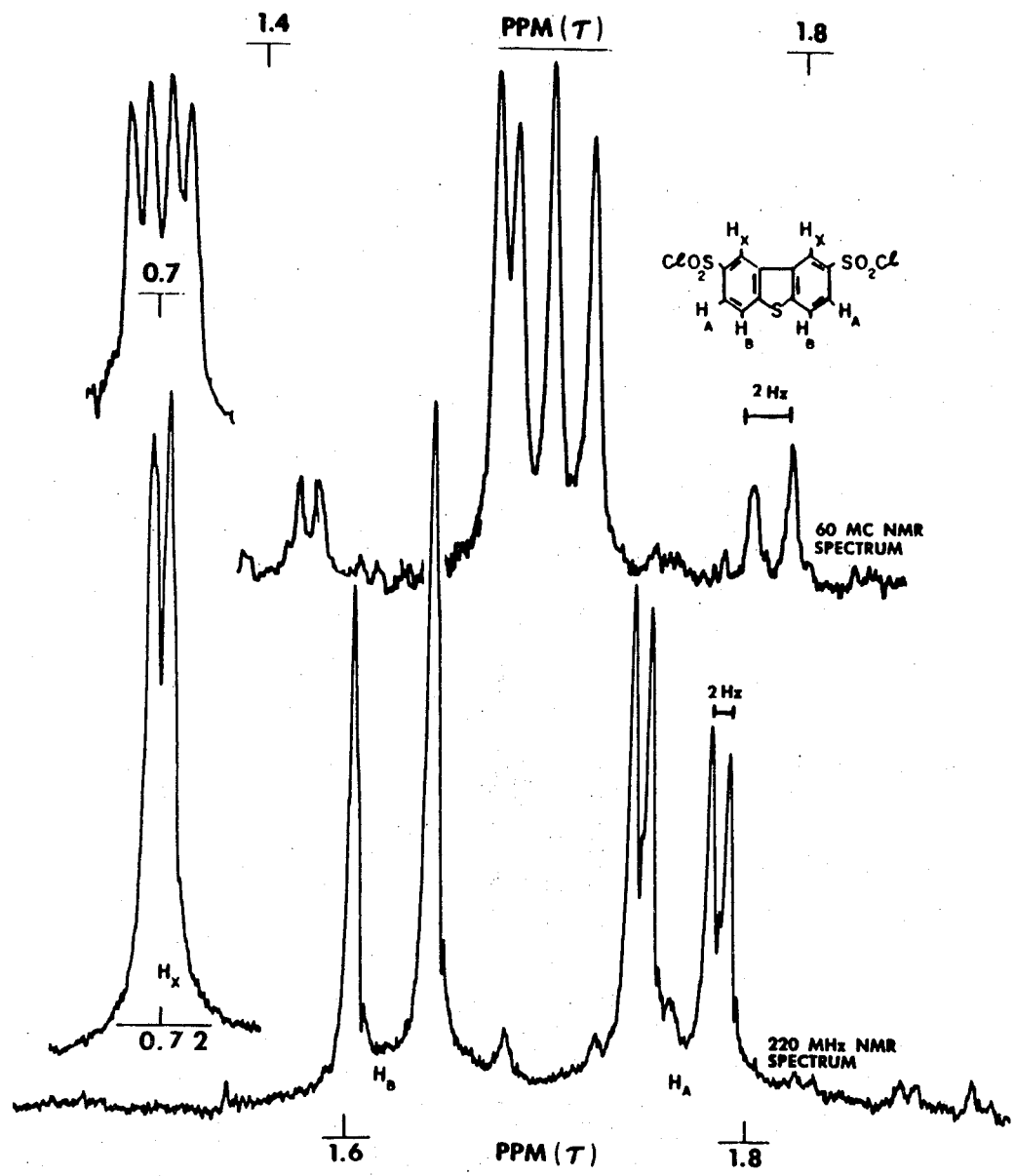

This invention relates to novel dibenzothiophene sulfonyl halides, polymers derived therefrom, and a novel intermediate useful in the preparation of the novel halides.

Aromatic polysulfone polymers are characterized by their excellent chemical stability and high thermal stability, making them particularly useful for coating of electrical wires, circuitry, and other coating applications where stability to high temperatures is required.

The novel compounds which constitute respectively the intermediate and the polymer forming monomers of this invention are (I) dibenzothiophene-2-monosulfonyl chloride-8-sulfonic acid dihydrate, (II) dibenzothiophene-2,8-disulfonyl chloride and (III) dibenzothiophene-2,8-disulfonyl bromide, illustrated below:

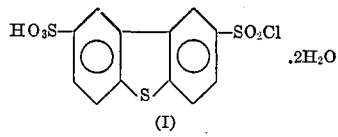

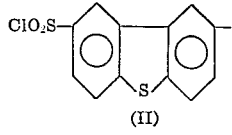      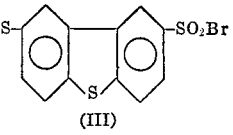

These compounds have not been described previously. Although dibenzothiophene-2-monosulfonyl chloride is known, being most readily formed from dibenzothiophene and one mole of chlorosulfonic acid, the introduction of a second sulfonyl chloride group into the dibenzothiophene molecule using an excess of chlorosulfonic acid is not feasible as this method produces high yields of intractable polymeric gums.

The present invention thus comprises novel substituted dibenzothiophene compounds of the group consisting of dibenzothiophene - 2,8 - disulfonyl chloride, dibenzothiophene-2,8-disulfonyl bromide, and dibenzothiophene-2-monosulfonyl chloride-8-sulfonic acid dihydrate. The present invention further comprises new methods for the preparation of the aforesaid dibenzothiophene derivatives. The invention also comprises novel condensation polymers of the foregoing dihalide derivatives, which polymers are thermoplastic and thermally stable dibenzothiophene based condensation polymers of the group consisting of aromtaic polysulfones, aromatic polysulfonamides, and aromatic polysulfonates, and which polymers consist of a plurality of repeating units having the structure:

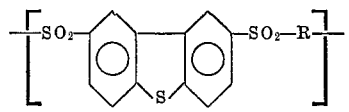

where R is a bivalent organic radical derived, by displacement of active hydrogen atoms, from a compound of the group consisting of condensed nuclear aromatic hydrocarbons, non-condensed polyaryl hydrocarbons, polyaralkyl hydrocarbons, polyaryl ethers, polyaryl sulfides, aromatic diamines, aromatic sulfur-, oxygen-, and mixed sulfur, oxygen-containing heterocyclic diamines, aliphatic diamines, cycloaliphatic diamines, aromatic diols, dihydric phenols, and condensed nuclear sulfur-, oxygen-, and mixed sulfur, oxygen-containing heteroaromatics of the group consisting of dibenzodioxin, thianthrene, phenoxathiin, dibenzofurane, xanthene, and thioxanthene. These polymers are useful as thermal insulating coatings for electrical wiring and circuitry. The present invention also comprises methods for the preparation of these novel condensation polymers.

According to the invention, the novel monomers and intermediates preferably are prepared by the following multi-stage procedure, which overcomes the aforementioned difficulties effectively.

The first stage, which is already known in the art, is conveniently accomplished in chlorinated hydrocarbon solvents at ambient temperatures by reacting dibenzothiophene with chlorosulfonic acid. This stage gives dibenzothiophene-2-monosulfonyl chloride in good yield. The second stage, sulfonation, is carried out in a chlorinated aliphatic hydrocarbon solvent medium by reacting dibenzothiophene-2-monosulfonyl chloride with liquid sulfur trioxide, forming thereby dibenzothiophene-2-sulfonyl chloride-8-sulfonic acid. These stages are illustrated as steps (1) and (2) shown in Scheme I:

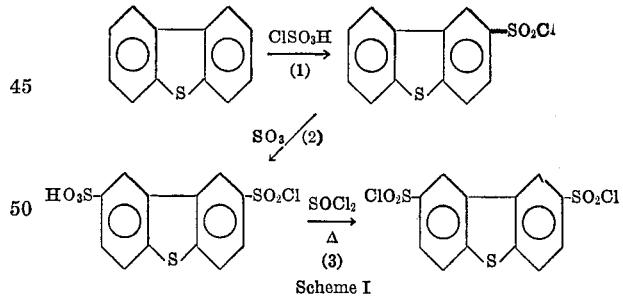

Scheme I

This second-stage sulfonation reaction occurs at appreciably lower temperatures than the first stage chlorosulfonation, preferably at about —40° C. to ambient temperatures due to the high reactivity of liquid sulfur trioxide. Because of this high reactivity, aromatic solvent media which would readily sulfonate are avoided. The overall yield of the first two stages is 60%. Final conversion to the disulfonyl chloride derivative is achieved upon reflux of the sulfonyl chloride-sulfonic acid intermediate with thionyl chloride as illustrated in step (3) shown in Scheme I.

Alternatively to the foregoing procedure, illustrated in Scheme I, dibenzothiophene can be sulfonated in a single-stage reaction to the 2,8-disulfonic acid derivative by excess of SO₃ in liquid sulfur dioxide as solvent, and the disulfonic acid derivative then reacted in a solvent therefor under reflux with thionyl chloride or thionyl bromide as shown in Scheme II, to form the desired dibenzothiophene-2,8-disulfonyl halide. The sulfonation reaction occurs at from −70° C. up to 10° C., preferably around −40° C., and in yield of about 40%. The reaction is less preferable than the multistage method detailed beforehand, as the intermediate disulfonic acid derivative is extremely hygroscopic, and there is obtained a lower overall yield of dibenzothiophene-2,8-disulfonyl halide. This alternative procedure is illustrated in Scheme II below.

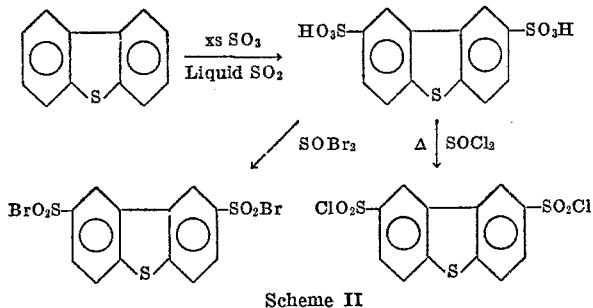

Scheme II

The disulfonyl bromide derivative may also be readily prepared by basic hydrolysis of either dibenzothiophene-2-monosulfonyl chloride-8-sulfonic acid or dibenzothiophene-2,8-disulfonyl chloride and subsequent treatment of the intermediate disulfonic acid with excess thionyl bromide. Both the disulfonyl chloride and disulfonyl bromide derivatives yield satisfactory elemental analysis as reported in the examples, and their infrared and nuclear magnetic resonance spectra are consistent with the proposed structures. The peak assignments in the NMR spectra have been made on the basis of published spectra of other substiuted dibenzothiophenes (E. Campaigne and J. Ashby, J. Heterocyclic Chem. 6, 517 (1969)). The dibenzothiophene - 2-monosulfonyl-chloride-8-sulfonic acid was characterized by elemental analysis as the dihydrate. Evidence for the dihydrate was further confirmed by its NMR and infra-red spectra.

Figure 2:
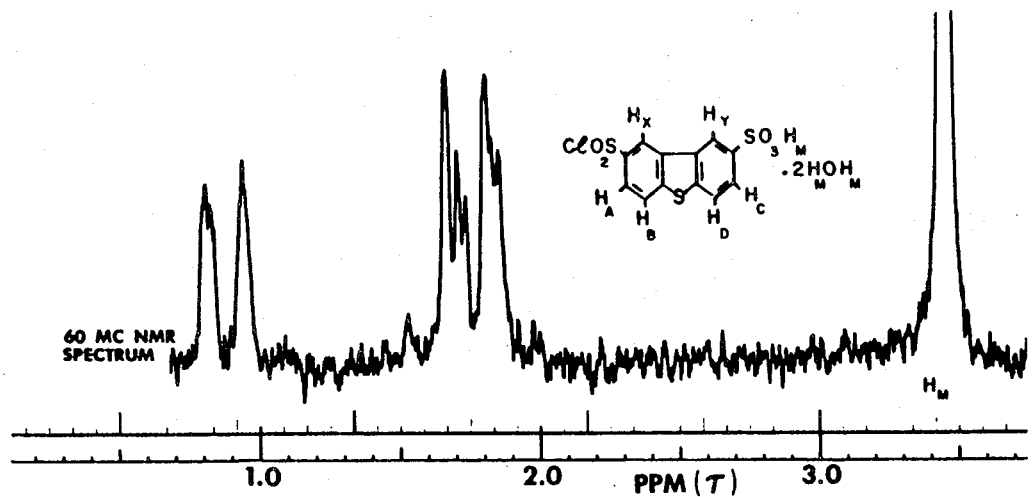
Figure 3:
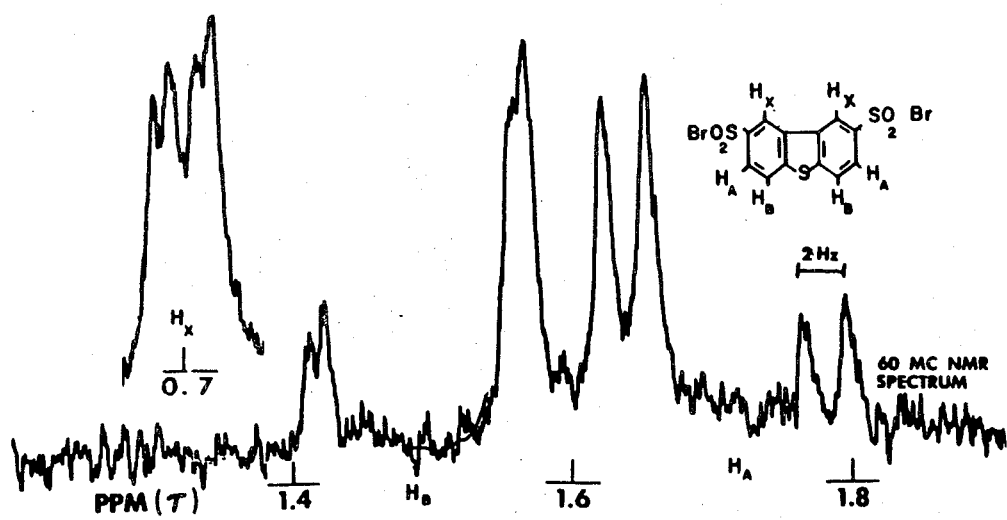
Figure 4:
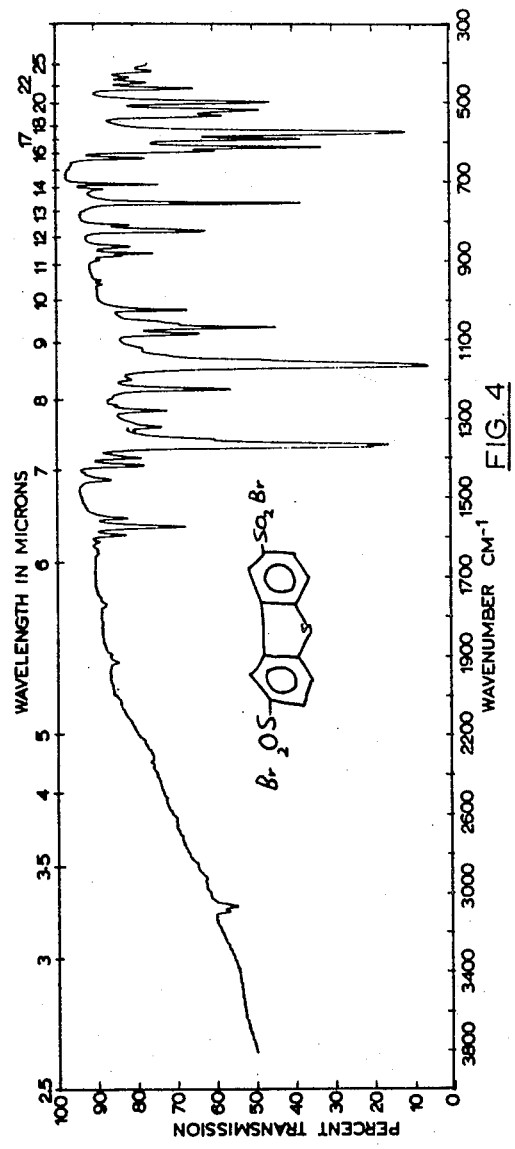
Figure 5:
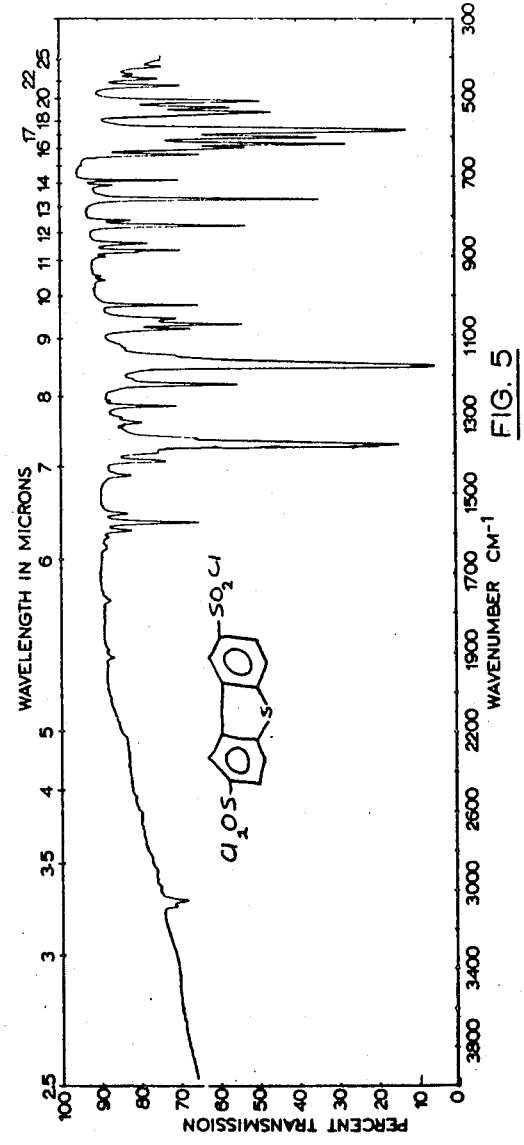

In the accompanying drawings, FIG. 1 depicts the 60 mc. and 220 mHz. NMR spectra of dibenzothiophene-2,8-disulfonyl chloride, FIG. 2 depicts the NMR spectrum of dibenzothiophene-2-sulfonyl chloride-8-sulfonic acid dihydrate, and FIG. 3 depicts the NMR spectrum of dibenzothiophene-2,8-disulfonyl bromide. FIG. 4 depicts the infrared spectrum of dibenzothiophene-2,8-disulfonyl bromide. FIG. 5 depicts the infrared spectrum of dibenzothiophene-2,8-disulfonyl chloride. FIG. 6 depicts the infrared spectrum of dibenzothiophene-2-sulfonyl chloride-8-sulfonic acid dihydrate. FIGS. 7–10 show the infrared spectra of various polymers derived from the dibenzothiophene-2,8-disulfonyl halides.

These spectra fully characterize the novel compounds and establish the positions of substitution for the sulfonyl halide groups. As the monosulfonyl chloride is known to be substituted in the 2-position, the disubstituted compound would be completely symmetrical about the vertical plane perpendicular to the plane of the dibenzothiophene moiety drawn through the sulfur atom. The 220 mHz. nuclear magnetic resonance spectrum in sulfolane supports this assignment due to the relatively simplified spectral pattern found in the aromatic region $\tau \simeq 1-2$. The three protons $H_A$, $H_B$, $H_X$ shown in FIG. 1 are in the intensity ratio of 1:1:1. If the substitution were not in the symmetrical 8-position this pattern would be far more complex in the aromatic region (see reference cited above). Hence the three dibenzothiophene derivatives, all of which can be interrelated by hydrolysis to the same diacid, are substituted in the 2,8-positions as described.

The novel dibenzothiophene-2,8-disulfonyl halides are useful as monomers for the preparation of new thermoplastic aromatic condensation polymers having excellent heat stability properties. The dibenzothiophene-2-monosulfonyl chloride-8-sulfonic acid intermediate and the known dibenzothiophene-2,8-disulfonic acid are not suitable as monomers for preparation of the aforementioned polymers due to their extreme hygroscopicity. The dibenzothiophene-2-monosulfonyl chloride-8-sulfonic acid has been isolated and characterized only as its dihydrate (vide supra).

These types of aromatic dibenzothiophene based condensation polymers can be prepared from the foregoing dibenzothiophene-2,8-disulfonyl halides by condensation polymerization as hereinafter described.

Illustrative of an embodiment of the process of condensation polymerization of the present invention is the preparation of the first of the foregoing three types of copolymers, namely polysulfones; they are produced by the condensation of the foregoing monomers with a wide variety of bivalent organic compounds in a liquid phase using a Friedel-Crafts catalyst according to the polymerization reaction:

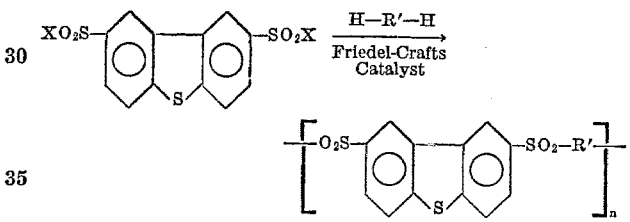

where R′ represents a bivalent radical derived by displacement of active hydrogen atoms from (1) a condensed nuclear aromatic hydrocarbon, (2) a polynuclear non-condensed aromatic hydrocarbon, (3) a polyaralkyl hydrocarbon, (4) a polyaryl ether, (5) a polyaryl sulfide, or (6) a condensed sulfur-, oxygen-, or mixed sulfur and oxygen-containing condensed nuclear heteroaromatic hydrocarbon, $n$ is the number of repeating units, and $x$ represents chlorine or bromine.

Preferably the difunctional aromatics contemplated as the comonomer in the foregoing polymerization reaction are selected from the class of condensed nuclear aromatic and sulfur and/or oxygen-containing heteroaromatic hydrocarbons, for example naphthalene, anthracene, phenanthrene, dibenzodioxin, thianthrene, phenoxathiin, dibenzofurane, xanthene, thioxanthene, and the like. Other dinuclear aromatics, for example, diphenyl, diphenyl ether, diphenyl sulfide and diaralkyls, and polynuclear non-condensed aromatics, for example the terphenyls, can be used with equally good results. The rigidity or flexibility of the polymer can be varied by the choice of the appropriate comonomers used.

This condensation polymerization can be conveniently carried out with aluminum chloride as the Friedel-Crafts catalyst; however, for higher yields a preferred catalyst is anhydrous ferric chloride which enables the polymerization to proceed under relatively mild conditions e.g. between 100 to 180° C. depending on the solvent used and requires only catalytic amounts as opposed to 1 molar proportion in the case of aluminum chloride. Preferred solvents for this polymerization are dimethyl sulfone, sulfolane, and alkylated cyclic lactams for example N-methylpyrrolidone, their strong polar characteristics being beneficial to solubilize the relatively insoluble dibenzothiophene-2,8-disulfonyl halide monomers. On the other hand, if the difunctional aromatic comonomer employed is a liquid at the temperature of the condensation, the polymerization can be conducted without a solvent.

Preparation of some dibenzothiophene based aromatic polysulfones in accordance with the present invention using the methods outlined above is illustrated hereinafter. Thus, condensation of dibenzothiophene-2,8-disulfonyl chloride with diphenyl in the presence of anhydrous ferric chloride as described in Example 6 gives a polymer having the repeating unit structure:

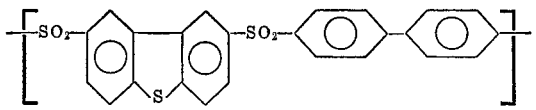

Similarly, the condensation of dibenzothiophene-2,8-disulfonyl chloride with diphenyl ether as described in Example 5 gives an aromatic dibenzothiophene based polysulfone polymer of the repeating unit structure:

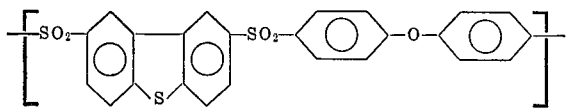

with a weight average molecular weight in the range of 5000–9000. This polymer shows excellent thermal stability, differential thermal analysis (DTA) indicating a softening point in excess of 300° C. and decomposition at 400° C.

Figure 8:
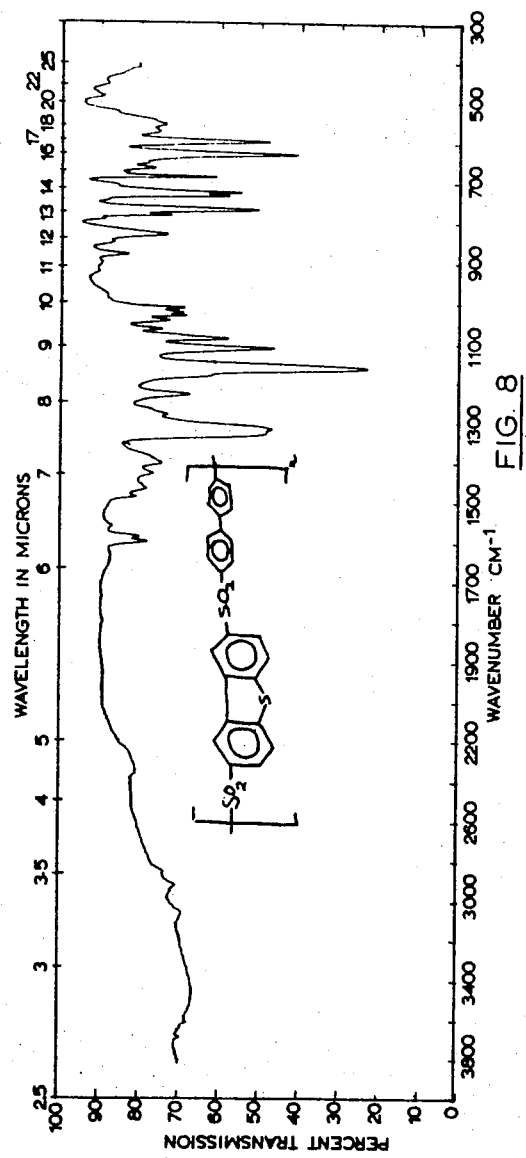

FIGS. 7 and 8 show the infra-red spectra of these two aromatic polysulfone polymers with strong characteristic sulfone (—$SO_2$—) absorption bands at 1300–1400 cm.$^{-1}$ and aromatic absorption bands at 750–800 cm.$^{-1}$.

The reduced viscosities of the various condensation polymers described herein were determined in an Ostwald or similar type viscometer at 25° C. by dissolution of a weighed sample of the aromatic polysulfone copolymer in an appropriate solvent such as dimethylformamide (DMF) or chloroform. Reduced viscosity values (RV) were obtained from the equation:

$$\text{Reduced viscosity} = \frac{t_s - t_o}{C \cdot t_o}$$

wherein:

$t_o$ is the efflux time of the pure solvent
$t_s$ is the efflux time of the polymer solution
C is the concentration of the polymer solution in terms of gms. of polymer per 100 mls. of solution.

Typical RV's ranged from 0.05 to 0.2. Average molecular weights determined by gel permeation chromatography (GPC) were of the order of 5000 to 25,000.

This embodiment of the invention thus also provides a new polymerization pathway to dibenzothiophene polysulfone polymer. Dibenzothiophene can be condensed smoothly with dibenzothiophene-2,8-disulfonyl halide in the presence of a Friedel-Crafts catalyst according to the following scheme to give a polysulfone having a high molecular weight (ca. 25,000) and the indicated structure:

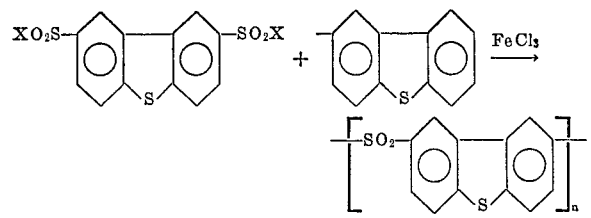

The foregoing polymerization is illustrated in Example 10.

Illustrative of another embodiment of the process of condensation polymerization of the present invention is the preparation of the dibenzothiophene based polysulfonamide polymers of the invention; they are produced by the condensation of the novel monomers of the invention with diamines according to the equation:

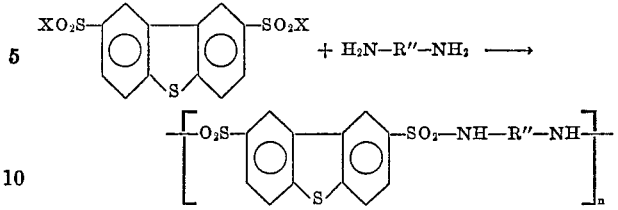

where —NH—R''—NH— is a bivalent organic radical derived, by displacement of active hydrogen atoms, from a material of the group consisting of aromatic diamines, aromatic sulfur-, oxygen-, and mixed sulfur, oxygen-containing heterocyclic diamines, cycloaliphatic diamines and aliphatic diamines. Thus the polysulfonamide polymers of this invention are prepared by the condensation polymerization of dibenzothiophene-2,8-disulfonyl halide with a diamine in a solvent for the reactants. This condensation is formally a Schotten-Baumann reaction and proceeds smoothly at much lower temperatures (e.g. 20° C. to 100° C.) than are required for the polysulfone polymerization described previously. A basic medium for this polymerization is necessary to remove the continuously formed hydrogen chloride by-product of the condensation; preferably a tertiary organic amine base, for example pyridine, triethylamine, and trimethylamine, is used as the basic medium, as such bases also serve as convenient solvents for the reactants.

Furthermore, it is to be emphasized that this condensation proceeds in the absence of a catalyst, thereby lowering the cost of the polymerization reaction and, in general, produces copolymers of higher molecular weight than the aforementioned aromatic polysulfones, due to the milder reaction conditions.

The diamines contemplated as the comonomers in this condensation include aromatic diamines, for example, benzidine; heteroaromatic diamines, for example 3,7-diaminodibenzothiophene, 3,7 - diaminodibenzothiophene-5,5-dioxide and the like; cycloaliphatic diamines; and aliphatic diamines, for example, hexamethylene diamine, ethylene diamine etc.

The polysulfonamides of this invention have good thermal characteristics, and softening points up to 340° C. (Example 8); like the aromatic polysulfones they may be utilized for thermally stable coating applications.

Illustrative of this embodiment is the condensation polymerization of dibenzothiophene-2,8-disulfonyl chloride with 3,7-diaminodibenzothiophene - 5,5 - dioxide described in Example 8. This polysulfonamide polymer had an RV of 0.095 and a softening point of 340° C. The repeating unit structure appears as shown:

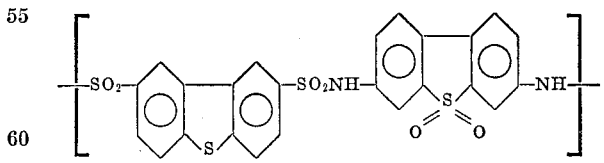

Figure 10:
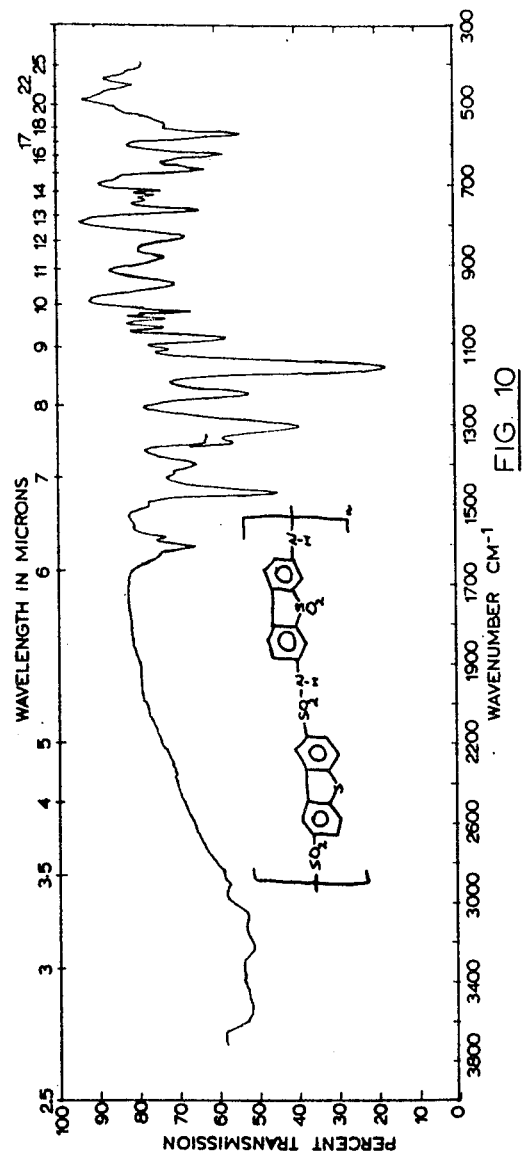

The infra-red spectrum of this polysulfonamide is depicted in FIG. 10.

The preparation of other polysulfonamides of the invention can further be practised by condensation of dibenzothiophene-2,8-disulfonyl chloride with an aliphatic diamine, for example hexamethylene diamine, or ethylene diamine, thus obtaining a polysulfonamide of the repeating unit structure:

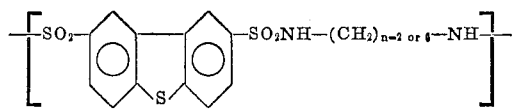

All of the polysulfonamide copolymers prepared in the examples given herein displayed a strong band at 1470 cm.$^{-1}$ for the sulfonamide grouping —SO$_2$—NH—.

Illustrative of still another embodiment of the process of condensation polymerization of the present invention is the preparation of the dibenzothiophene based sulfonate ester polymers of the invention; they are produced by the condensation of the novel monomers of the invention with aromatic diols or dihydric phenols according to the equation:

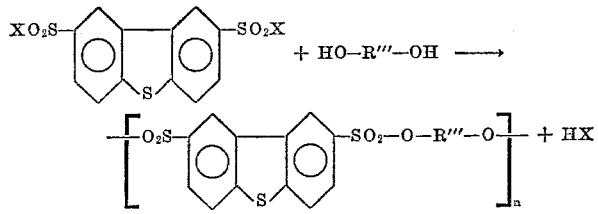

where —O—R'''—O— is a bivalent organic radical derived, by displacement of active hydrogen atoms, from a compound of the group consisting of aromatic diols and dihydric phenols. More particularly, this condensation polymerization comprises the reaction of a dibenzothiophene-2,8-disulfonyl halide with a dihydroxy aromatic comonomer under anhydrous conditions in an inert polar solvent, for example dimethyl sulfoxide, at the reflux temperature. Alternatively, the reaction may be carried out using the alkali salt of the dihydroxy aromatic comonomer. The salts are produced by reaction of the dihydroxy compounds with strong inorganic bases of the alkali metal or alkaline earth groups, the most common being sodium hydroxide and potassium hydroxide. The salt formation must be carried out in a solvent system capable of azeotropically removing the water formed in the reaction. The subsequent reaction of the dibenzothiophene-2,8-disulfonyl halide with the anhydrous dibasic salt is preferable because both the temperature and reaction time of the condensation polymerization are reduced thereby.

One preferred embodiment of the polysulfonate condensation polymerization comprises the reacting of diphenylol propane as the comonomer together with dibenzothiophene-2,8-disulfonyl chloride as illustrated in Example 7. The aromatic polysulfonate thus prepared has the repeating unit structure,

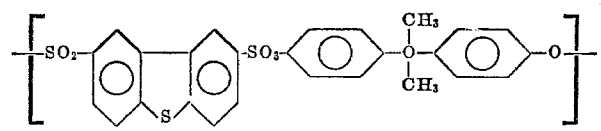

The examples to follow serve to illustrate various aspects of the present invention but are not intended to limit the scope thereof.

As mentioned previously, the known dibenzothiophene-2-monosulfonyl chloride may serve as a starting material for the novel disulfonyl halide dibenzothiophene monomers of the present invention. Reference to this compound may be found in Comptes Rendus 198, 2260 (1934) (see also Chem. Abs. 28 6144 (1934)). The following preparation is a modification of the method used in the art to synthesize dibenzothiophene-2-monosulfonyl chloride.

Dibenzothiophene (100 g.) was dissolved in chloroform (550 mls.) and the solution cooled to +5° C. Thionyl chloride (10 mls.) and chlorsulfonic acid (40 mls.) in chloroform (50 mls.) were added and the mixture stirred three hours at room temperature. Dimethylformamide (DMF) (50 mls.) and then thionyl chloride (100 mls.) were added and the mixture further stirred two hours at 45° C. After cooling, the solution was poured into ice-water, the chloroform layer washed thoroughly with water, 5% sodium bicarbonate solution, water, then dried and evaporated. The crude product after washing with ether (400 mls.) gave dibenzothiophene 2-monosulfonyl chloride which was then recrystallised from benzene to give 107 grams of product having a M.P. of 141–141.5° C. (lit. 141° C.), overall yield 70%.

EXAMPLE 1

Dibenzothiophene-2-monosulfonyl chloride (14.2 g.) in 1,2-dichloroethane (100 mls.) was reacted with sulfur trioxide (4 g.) in dichloroethane at room temperature. The resultant white solid was hydroscopic; it was filtered off and washed thoroughly with cold chloroform. On crystallization from acetonitrile the product was identified as dibenzothiophene-2-monosulfonyl chloride - 8 - sulfonic acid dihydrate, melting point 270° C. (decomposition) (Titration-product=2.99 equivs.). Yield of product was 15.5 g., 85%.

The NMR spectrum of this compound is shown in FIG. 2, the infrared spectrum in FIG. 6. Calc. for $C_{12}H_7S_3O_5Cl.2H_2O$ (percent): C, 36.1; H, 2.7; S, 24.1; Cl, 8.9. Found (percent): C, 36.4; H, 2.8; S, 23.8; Cl, 8.5.

EXAMPLE 2

Dibenzothiophene - 2 - monosulfonyl chloride-8-sulfonic acid (9.8 g.) was added to dimethylformamide (20 mls.) and chloroform (50 mls.). Thionyl chloride (10 mls.) was added and the mixture refluxed for 3 hours. The solution was cooled in ice-water and the resulting crystalline disulfonyl chloride filtered off. Recrystallisation from acetonitrile gave dibenzothiophene-2,8-disulfonyl chloride, melting point 248–9° C. Yield of product was 9.0 g., 87%. Calc. for $C_{12}H_6S_3O_4Cl_2$ (percent): C, 37.8; H, 1.6; S, 25.2; Cl, 18.8. Found (percent): C, 37.5; H, 1.7; S, 25.1; Cl, 19.1.

Infrared and NMR spectra for this compound are as shown in FIGS. 5 and 1.

EXAMPLE 3

Dibenzothiophene (9.2 g.) was added to liquid sulfur dioxide (150 mls.) at −78° C. and sulfur trioxide (8 g.) was added dropwise to the pale yellow solution, with stirring. The stirred solution was then allowed to come to room temperature slowly. After evaporation of the sulfur dioxide, the white solid obtained was washed thoroughly with cold 1,2-dichloroethane and then added to a mixture of chloroform (50 mls.), dimethylformamide (10 mls.) and thionyl chloride (10 mls.) and refluxed for three hours. The refluxed solution was cooled in ice-water and the thus precipitated crystalline solid filtered and recrystalised from acetonitrile to give dibenzothiophene-2,8-disulfonyl chloride, identified by melting point and mixed melting point with the product prepared in the previous example. Yield of product was 8.1 g. 43%. Dibenzothiophene - 2,8 - disulfonamide was prepared by a modified Schotten-Baumann reaction involving the addition of dibenzothiophene-2,8-disulfonyl chloride (5 g.) to pyridine (10 mls.), followed by addition of saturated aqueous ammonia solution (10 mls.). The precipitated solid derivative was filtered off and crystallised from acetonitrile/sulfolane. The derivative had a melting point greater than 300° C.; yield of derivative was 4.5 g., 49%. Calc. for $C_{12}H_{10}S_3O_4N_2$ (percent): C, 42.2; H, 3.0; N, 8.3. Found (percent): C, 42.1; H, 3.1; N, 8.3.

EXAMPLE 4

Dibenzothiophene-2,8-disulfonyl chloride (9.5 g.) was refluxed six hours with aqueous potassium hydroxide solution (6.5%, 50 mls.). On cooling the solution in an ice bath, the dipotassium salt of dibenzothiophene-2,8-disulfonic acid crystallised and was removed by filtration. The crystalline solid was redissolved in water and passed down an ion-exchange column of Dowex 50H (trademark) resin, and the solution obtained evaporated to dryness. The resulting dibenzothiophene-2,8-disulfonic acid was dried thoroughly in vacum before the next step. Yield was 5.6 g., 72%, melting point greater than 300° C. (decomposition).

The hygroscopic disulfonic acid (5 g.) was transferred rapidly to a 250 mls. flask and chloroform (50 mls.), dimethylformamide (10 mls.) and thionyl bromide (5 mls.) were added. The mixture was refluxed 3 hours and then chilled. The dibenzothiophene-2,8-disulfonyl bromide crystallised and was removed by filtration. Recrystallisation from acetonitrile afforded 2.3 g. (30%) of a white solid, melting point 220° C. (decomposition). Calc. for $C_{12}H_6S_3O_4Br_2$ (percent): C, 30.7; H, 1.3; S, 20.4. Found (percent): C, 31.1; H, 1.5; S, 20.3.

Infrared and NMR spectra for this compound are as shown in FIGS. 4 and 3.

EXAMPLE 5

Dibenzothiophene-2,8-disulfonyl chloride (3.46 g.) and diphenyl ether (1.54 g.) were added to sulfolane (45 mls.) in a flask equipped with a heating mantle, thermometer, stirrer, nitrogen inlet tube, condenser and an exit tube for measurement of evolved hydrogen chloride gas. At reaction temperature of 150° C., 10 mls. of an anhydrous ferric chloride solution (0.25 g./ 50 mls. sulfolane) was added as catalyst through a septum. Reaction was 72% complete in 3 hours and 99.5% complete after 28 hours as evidenced by titration of the evolved hydrogen chloride gas with standard 0.5 N sodium hydroxide. The reaction mixture was poured into methylene chloride and the insoluble polymer filtered. Yield of polymer was 4.1 g. (86%), its softening point greater than 300° C. (measured by differential thermal analysis—DTA), with decomposition occurring at 400° C. The polymer had a reduced viscosity of 0.06 (1% solution in dimethyl formamide—DMF). The weight average molecular weight determined by gel permeation chromatography was 9000.

The infra-red spectrum of the foregoing polymer is shown in FIG. 7.

EXAMPLE 6

Dibenzothiophene-2,8-disulfonyl chloride (3.81 g.) and diphenyl (1.54 g.) were added to sulfolane (50 mls.) and copolymerized at 150° C. using 10 mls. of an anhydrous ferric chloride solution (0.5%) as in the preceding example. The reaction was 50% complete in 7 hours. A further 10 mls. of catalyst was added at this stage and the reaction was complete in 30 hours. Isolated yield of polymer was 3.9 g., 85%, and the softening point greater than 400° C. The reduced viscosity was 0.05 (1% solution in DMF).

The infra-red spectrum of this polymer is shown in FIG. 8.

EXAMPLE 7

A flask was fitted with a stirrer, thermometer, condenser and Dean-Stark trap filled with benzene. Diphenylol propane (5.8 g.) was placed in the flask together with dimethyl sulfoxide (25 mls.), benzene (3 mls.) and 6.4 g. of a 42.8% aqueous solution of potassium hydroxide. Nitrogen was allowed to pass over the solution to prevent oxidation. The mixture was refluxed 4 hours at 135° C. during which time water was removed via the trap. The solution was then cooled and dibenzothiophene-2,8-disulfonyl chloride (9.5 g.) dissolved in dimethyl sulfoxide (50 mls.) added. A precipitate of polysulfonate polymer formed; the reaction mixture was poured into water (200 mls.) and the white polymeric product was filtered off. The polymer was washed with cold chloroform and with water, then dried in a vacuum oven. Yield of polymer was 10.0 g., 75%, softening point 250° C. A reduced viscosity of 0.05 was observed (1% solution in DMF).

Figure 9:
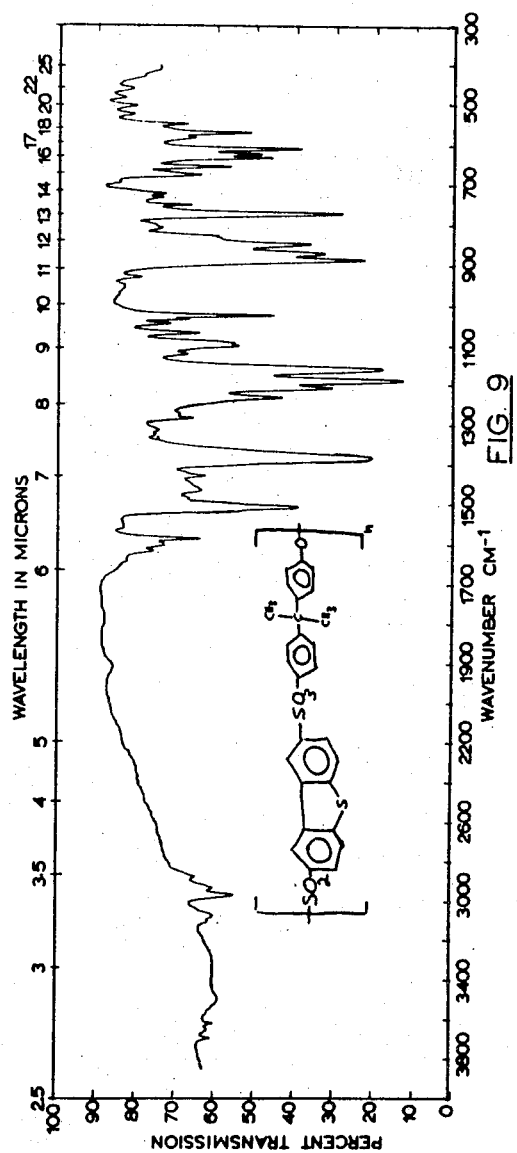

Infra-red spectrum of the foregoing polymer is as shown in FIG. 9.

EXAMPLE 8

Dibenzothiophene-2,8-disulfonyl chloride (3.8 g.) was dissolved in pyridine (10 mls.). 3,7-diaminodibenzothiophene-5,5-dioxide (2.5 g.) was dissolved in pyridine (10 mls.) and the diamine solution was slowly added to the chloride solution. The resulting red solution was heated 1 hour at 60° C. and then poured into water (100 mls.). The precipitated deep red polymer was filtered, washed with chloroform, water and then dried. Yield of polymer was 3.1 g., (56%) and the softening point 340° C. The reduced viscosity was 0.095 (1% solution in DMF).

The infra-red spectrum of this polymer is shown in FIG. 10.

EXAMPLE 9

Dibenzothiophene-2,8-disulfonyl chloride (1.9 g.) was placed in a flask and pyridine (5 mls.) added. Ethylene diamine (0.3 g.) was added dropwise with stirring. A strongly exothermic reaction occurred and the reaction mixture was allowed to stand one hour at 60° C. Water was then added and the precipitated yellow insoluble polymer filtered.

The yield of polymer was 1.5 g. (82%); the polymer had a softening point of 265° C., and a reduced viscosity of 0.055 (1% solution in DMF).

EXAMPLE 10

Dibenzothiophene-2,8-disulfonyl chloride (3.50 g.) and dibenzothiophene (1.84 g.) were added to sulfolane (50 mls.) and polymerized at 150° C. using 10 mls. of anhydrous ferric chloride solution (0.5%) as in Example 5. The reaction was 80% complete in 6 hours and 99.5% complete in 24 hours. Isolated yield of dry polymer was 3.9 g., 87%. The softening point was greater than 400° C. and the reduced viscosity 0.16 (1% solution in DMF). The weight average molecular weight as shown by gel permeation chromatography was 25,000.

Numerous variations and modifications can be made in the various expedients described herein without departing from the invention, the scope of which is defined in the following claims.

What is claimed is:

1. A compound of the group consisting of dibenzothiophene-2,8-disulfonyl chloride; dibenzothiophene-2,8-disulfonyl bromide; and dibenzothiophene-2-monosulfonyl chloride-8-sulfonic acid dihydrate.

2. A compound as claimed in claim 1, which is dibenzothiophene-2,8-disulfonyl chloride.

3. A compound as claimed in claim 1, which is dibenzothiophene-2,8-disulfonyl bromide.

4. A compound as claimed in claim 1, which is dibenzothiophene - 2 - monosulfonyl chloride - 8 - sulfonic acid dihydrate.

5. Process for the preparation of a dibenzothiophene-2,8-disulfonyl halide in which the halide is of the group consisting of chloride and bromide, which comprises (A) reacting a compound of the group consisting of (1) dibenzothiophene and (2) dibenzothiophene-2-monosulfonyl chloride with sulfur trioxide to form a sulfonic acid product, said product being dibenzothiophene-2,8-disulfonic acid when said compound is dibenzothiophene and being dibenzothiophene-2-monosulfonyl chloride-8-sulfonic acid when said compound is dibenzothiophene-2-monosulfonyl chloride, (B) reacting said sulfonic acid product in a solvent therefor under reflux with a thionyl halide of the group consisting of thionyl chloride and thionyl bromide, said thionyl halide being thionyl chloride when said product is dibenzothiophene-2-sulfonyl chloride-8-sulfonic acid and (3) separating the dibenzothiophene-2,8-disulfonyl halide so formed from the reaction medium.

6. Process as claimed in claim 5 in which the compound is dissolved in a solvent for reaction with sulfur trioxide, said solvent being liquid sulfur dioxide when the compound is dibenzothiophene and being a liquid chlorinated hydrocarbon solvent when said compound is dibenzothiophene-2-monosulfonyl chloride.

7. A process which comprises reacting dibenzothiophene-2-monosulfonyl chloride with sulfur trioxide in a liquid chlorinated aliphatic hydrocarbon solvent to form dibenzothiophene - 2 - monosulfonyl chloride-8-sulfonic acid, and separating said product from the reaction medium.

8. A process as claimed in claim 7, and including the additional steps of reacting the separated product with thionyl chloride under reflux to form dibenzothiophene-2,8-disulfonyl chloride, and separating said product from the reaction medium.

9. A process as claimed in claim 8 in which the reaction is carried out in a solvent for the reactants.

10. A process as claimed in claim 7, including the additional steps of hydrolyzing the separated product to form dibenzothiophene-2,8-disulfonic acid, separating said disulfonic acid, and reacting it with thionyl bromide under reflux to form dibenzothiophene-2,8-sulfonyl bromide.

11. A process for the preparation of a dibenzothiophene-2,8-disulfonyl halide in which the halide is of the group consisting of chloride and bromide, which comprises reacting dibenzothiophene with sulfur trioxide in liquid sulfur dioxide solvent to form dibenzothiophene-2,8-disulfonic acid, separating the said disulfonic acid and reacting it in a solvent therefor under reflux with a thionyl halide of the group consisting of thionyl chloride and thionyl bromide to form the corresponding dibenzothiophene-2,8-disulfonyl halide.

References Cited

UNITED STATES PATENTS

| | | | |
|---|---|---|---|
| 2,937,089 | 5/1960 | Jones et al. | 96—100 |
| 3,031,460 | 4/1962 | Marschall | 260—329.3 |
| 3,226,247 | 12/1965 | Forster | 117—33.5 |

HENRY R. JILES, Primary Examiner

C. M. SHURKO, Assistant Examiner

U.S. Cl. X.R.

252—62; 260—79.3 M